Figure 1:
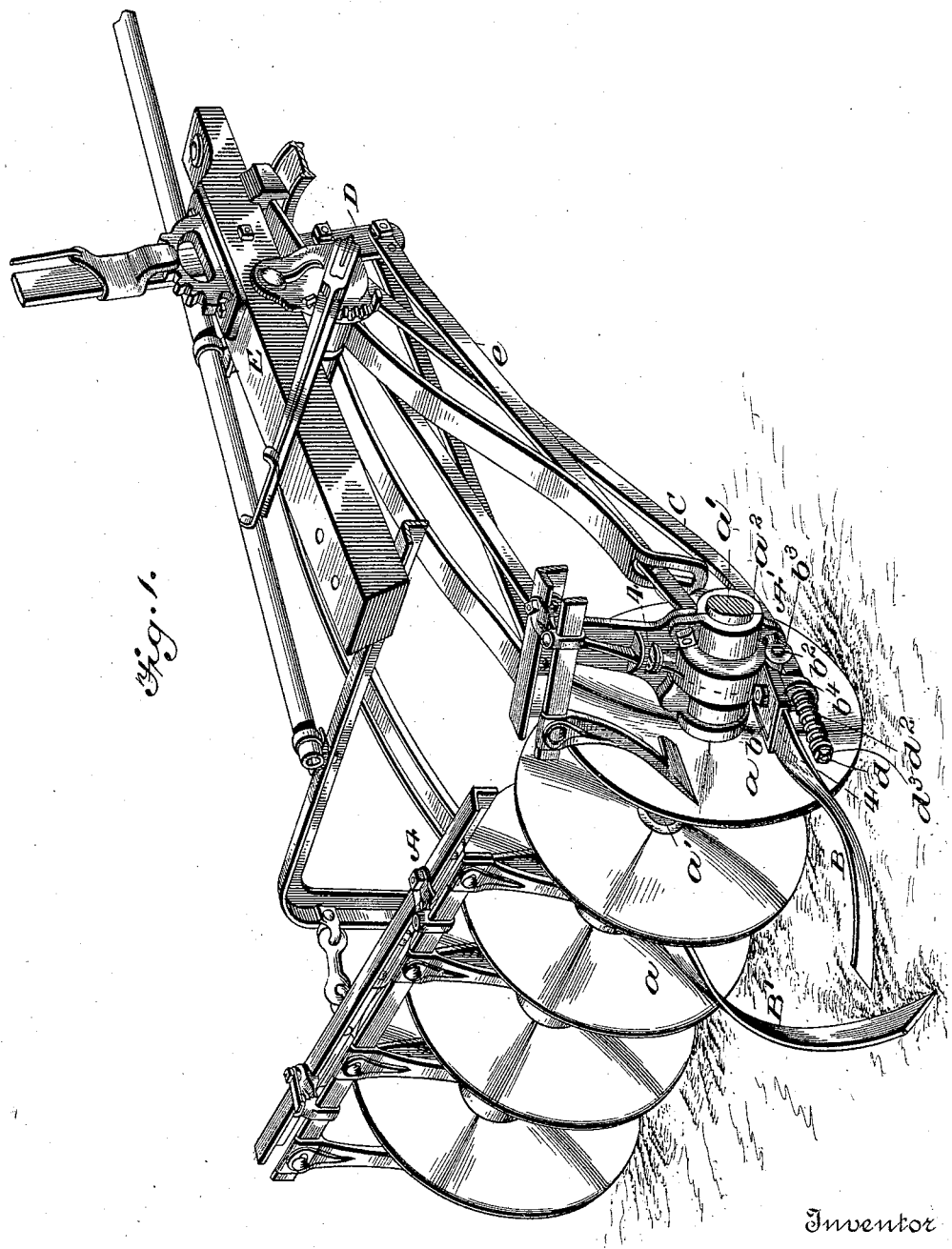

(No Model.) 2 Sheets—Sheet 1.
M. J. TODD.
ATTACHMENT FOR DISK HARROWS.

No. 585,136. Patented June 22, 1897.

Witnesses
Inventor
Attorney

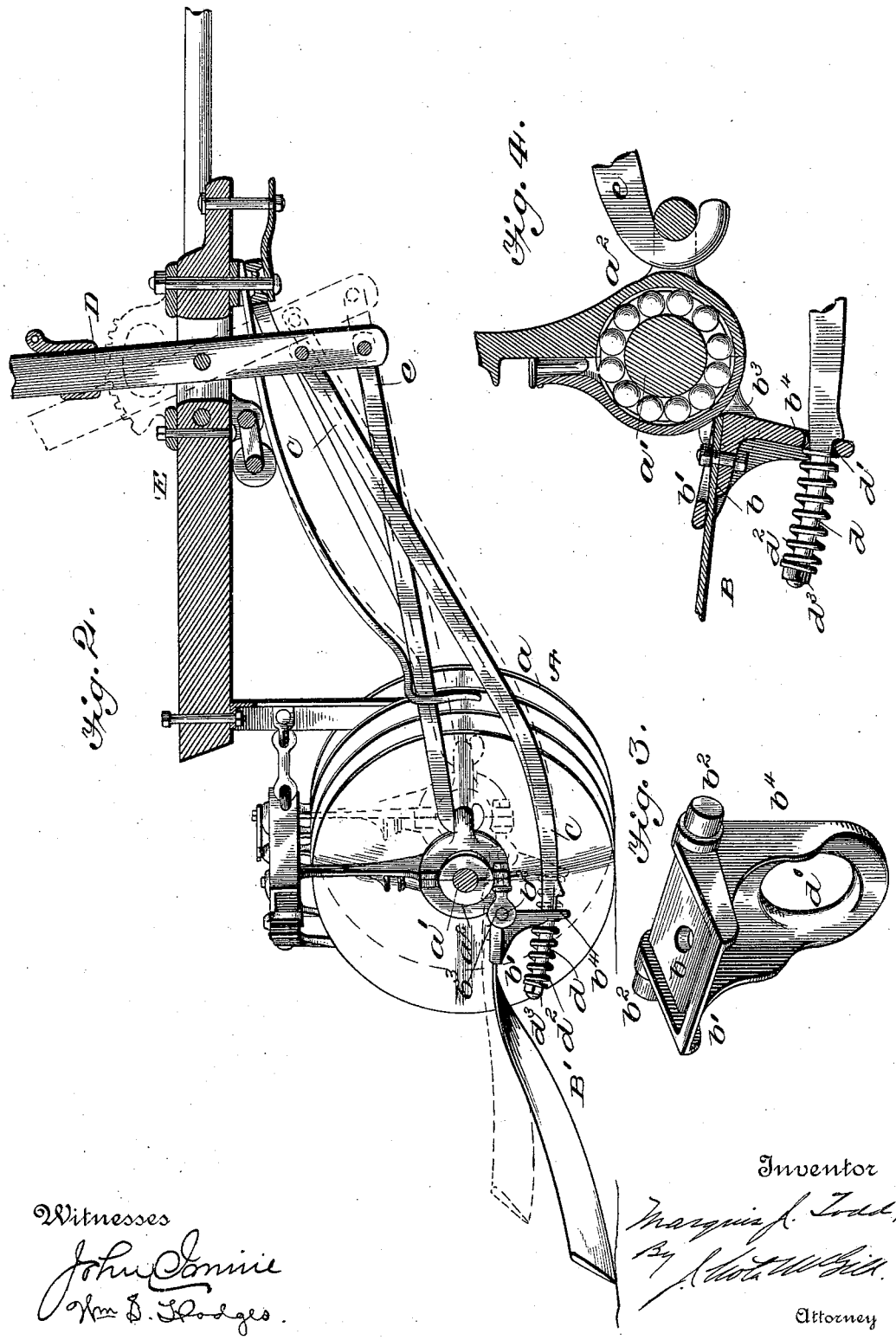

UNITED STATES PATENT OFFICE.

MARQUIS J. TODD, OF BUFFALO, NEW YORK, ASSIGNOR TO THE PITTS AGRICULTURAL WORKS, OF SAME PLACE.

ATTACHMENT FOR DISK HARROWS.

SPECIFICATION forming part of Letters Patent No. 585,136, dated June 22, 1897.

Application filed March 13, 1896. Serial No. 583,097. (No model.)

*To all whom it may concern:*

Be it known that I, MARQUIS J. TODD, of Buffalo, in the county of Erie and State of New York, have invented certain new and useful Improvements in Attachments for Disk Harrows; and I do hereby declare the following to be a full, clear, and exact description of the invention, such as will enable others skilled in the art to which it appertains to make and use the same.

This invention contemplates certain new and useful improvements in attachments for disk harrows.

The object of the invention is to provide a simple and inexpensive attachment for cutting out or twisting the ridge that is usually left between the two gangs of disks in such way that the soil is leveled and left in a pulverized condition without throwing the soil to either side, forming a perfect seed-bed. This is accomplished by means of two blades which are carried by the two gangs of disks adjacent to the inner ends thereof and which are bent or curved to overlap the space between said gangs in rear of the latter. These blades are of different lengths, so that one will cut out the center ridge, throwing the soil against the longer blade, which again throws it back in a leveled pulverized condition. The blades are mounted at their upper ends on pivoted supports, which are adjustable by means of a lever. The latter may also be the lever for shifting the gangs, and in that event the connections to that lever are such that the blades will be thrown into or out of operation simultaneously with the gangs. Springs may be used for allowing a yielding movement of the blades in the event of their coming into contact with any obstruction.

The invention will be hereinafter fully set forth, and particularly pointed out in the claims.

In the accompanying drawings, Figure 1 is a view in perspective of a portion of a disk harrow provided with my improved attachment. Fig. 2 is an inner end view of one of the gangs with parts in section and other parts removed. Fig. 3 is a detail. Fig. 4 is a central longitudinal sectional view on line 4 4, Fig. 1.

Referring to the drawings, A A' designate two gangs of disks, which may be of any preferred form of construction. The series of disks $a$ are, as customary, mounted on vertical axles $a'$, the latter near their inner ends being, as usual, mounted in boxes $a^2$.

B B' are two cutting-blades connected at their upper ends to the inner ends of the gangs between two of the disks and bent or curved in such manner that their lower free ends extend transversely over the space between the two gangs, whereby they will cut the ridge usually left between the gangs. The blade B' is longer than the blade B, so that it will extend in rear of and overlap the free end of the latter. The object of thus bending and extending the two cutting-blades is that the shorter one, B, will in operation cut out the center ridge left by the gangs, throw the soil against the longer one, B', which again throws it back in a leveled pulverized condition, forming a perfect soil-bed and avoiding the formation of any cut-out or ridge. The shape and curvature given these cutting-blades prevent trash or weeds gathering thereon, the lower portions of said blades occupying, when in operation, a slightly-inclined position.

In order to allow for the raising and lowering of the blades, I secure each of them at its upper end to seat $b$ of a clip $b'$, which latter has at its sides trunnions $b^2$, which fit loose in two eyes $b^3$, projecting rearward from boxes $a^2$. Each clip has a downwardly-extending right-angular portion $b^4$ of U-form, with which engages one end of an arm C. Said end is preferably reduced, as at $d$, and extended through an opening $d'$ in said portion $b^4$. A coil-spring $d^2$, held on said reduced end by a nut $d^3$, allows each blade to rise upon striking any obstruction and to conform to rough stony land.

The arms C at their upper forward ends are connected to an operating-lever D, fulcrumed on the harrow-frame E. This lever may, as shown in the present instance, be the adjusting-lever for the disk gangs. In that event the adjusting-arms $e$ leading from the latter are connected to said lever at its lower end, while the arms C are pivoted thereto at a point between said lower end and the fulcrum thereof, so that in throwing the inner ends of the gangs rearward into working position the arms C will travel slower than the gang-adjusting arms e. Hence, although the blades are being moved rearward bodily with the gangs, yet the connections of the lever D to the depending portions of the clips serve to draw the lower ends of the latter forward and effect the turning of the clips on their pivots and the consequent lowering of the outer free ends of the blades. In this way the adjustment of the disk gangs and the cutting-blades is simultaneous, but by reason of the difference in the points of connection of the two sets of arms to the operating-lever the gangs are moved at a speed faster than the blades are raised and lowered.

The advantages of my invention are apparent to those skilled in the art to which it appertains. It will be observed that I have provided a simple and inexpensive attachment capable of being applied to any disk harrow whereby the ridge usually left between the two gangs of disks is cut and leveled by the two cutting-blades. I am aware that heretofore it has been sought to obviate this ridge by employing an additional centrally-located disk, but the latter has decided disadvantages in that it forms a single cut-out with the dirt or soil thrown upon one side, while by means of my invention this cut-out is avoided and the earth is left in a leveled pulverized condition.

The attachment is simple and inexpensive and not liable to readily get out of order.

I claim as my invention—

1. In a disk harrow having two or more gangs of disks, a cutting-blade carried by each of said gangs near the inner end thereof, said blades being of different lengths so that one will extend in rear of and overlap the end of the other, both of said blades being bent or curved so as to extend transversely across the line between the gangs in rear of the latter, and means for raising and lowering said blades simultaneously with the adjustment of said gangs, substantially as set forth.

2. In a disk harrow having two or more gangs of disks, means for adjusting the same, cutting-blades carried by said gangs near the inner ends thereof and bent or curved so as to extend transversely across the line between the gangs in rear of the latter, and means for raising and lowering the outer ends of said blades simultaneously with the adjustment of said gangs as set forth.

3. In a disk harrow having two or more gangs of disks, cutting-blades bent or curved so as to extend transversely across the line between the gangs in rear of the latter, clips pivotally mounted on said gangs and to which said blades are united, said clips having depending angular portions, an adjusting-lever, and arms connected to said lever and also to said depending portions of said clips, substantially as set forth.

4. In a disk harrow having two or more gangs of disks, cutting-blades bent or curved so as to extend transversely across the line between the gangs in rear of the latter, clips pivotally mounted on said gangs and to which said blades are connected, said clips having depending angular portions provided with holes or openings, an adjusting-lever, arms connected to said lever and extended at their rear ends through said holes or openings, and coil-springs on said arms engaging said depending portions of said clips, as set forth.

5. A disk harrow having two gangs, means for adjusting the same, cutting-blades carried by said gangs and extended transversely across the line between said gangs, and means for raising and lowering said blades simultaneously with the adjustment of said gangs but at a speed slower than the latter, substantially as set forth.

6. In a disk harrow having two gangs of disks, an adjusting-lever and arms connecting the latter to the inner ends of said gangs, cutting-blades having clips pivotally mounted on said gangs near the inner ends of the latter, said blades being extended transversely across the line between said gangs, and arms connected to said clips and also to said lever at a point between the fulcrum thereof and the connection of said gang-adjusting arms, substantially as set forth.

7. The combination with the gangs of disks, the adjusting-lever and the arms connecting the latter to said gangs, of the clips pivotally mounted on said gangs, the blades secured thereto bent or curved transversely across the line between said gangs, said clips having depending angular portions, arms engaging said depending portions and springs on said arms, said latter arms being connected to said lever at a point between the fulcrum thereof and the connection of said gang-adjusting arms, substantially as set forth.

In testimony whereof I have signed this specification in the presence of two subscribing witnesses.

MARQUIS J. TODD.

Witnesses:
J. NOTA MCGILL,
WM. S. HODGES.